US011067852B2

(12) United States Patent
Yan et al.

(10) Patent No.: US 11,067,852 B2
(45) Date of Patent: Jul. 20, 2021

(54) LIQUID CRYSTAL DISPLAY DEVICE

(71) Applicant: HISENSE VISUAL TECHNOLOGY CO., LTD., Shandong (CN)

(72) Inventors: Guangwei Yan, Shandong (CN); Zhiqiang Tang, Shandong (CN); Ningning Cheng, Shandong (CN); Jianguo Han, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/792,490

(22) Filed: Feb. 17, 2020

(65) Prior Publication Data
US 2020/0209687 A1 Jul. 2, 2020

Related U.S. Application Data

(63) Continuation of application No. PCT/CN2019/129387, filed on Dec. 27, 2019.

(30) Foreign Application Priority Data

Jan. 2, 2019 (CN) .......................... 201910001528.3
Jan. 31, 2019 (CN) .......................... 201910100426.7

(51) Int. Cl.
*G02F 1/13357* (2006.01)
*G02F 1/1333* (2006.01)

(52) U.S. Cl.
CPC .. *G02F 1/133608* (2013.01); *G02F 1/133308* (2013.01); *G02F 1/133606* (2013.01); *G02F 1/133314* (2021.01); *G02F 1/133317* (2021.01)

(58) Field of Classification Search
None
See application file for complete search history.

(56) References Cited

U.S. PATENT DOCUMENTS

2008/0192168 A1\* 8/2008 Sudo ................ G02F 1/133308
349/58
2009/0168405 A1\* 7/2009 Yoo .................. G02F 1/133608
362/97.2

(Continued)

FOREIGN PATENT DOCUMENTS

CN 101290433 A 10/2008
CN 102932617 A 2/2013

(Continued)

OTHER PUBLICATIONS

Translation of CN104534351A (Year: 2020).\*

(Continued)

*Primary Examiner* — Phu Vu
(74) *Attorney, Agent, or Firm* — Brinks Gilson & Lione

(57) ABSTRACT

The present disclosure describes a liquid crystal display device. The liquid crystal display device includes a back plate, a middle frame and a diffusion plate. The back plate includes a bottom portion, and a side wall perpendicular to the bottom portion. The middle frame includes a first support portion and a second support portion which are disposed in opposite, and a middle frame connection portion. The middle frame connection portion connects the first support portion and the second support portion. The first support portion is parallel to the bottom portion. The first support portion, the second support portion and the middle frame connection portion form a recess. A portion of the diffusion plate is within the recess.

11 Claims, 11 Drawing Sheets

(56) References Cited

U.S. PATENT DOCUMENTS

| | | | | |
|---|---|---|---|---|
| 2013/0141665 A1* | 6/2013 | Huang | ............. | G02F 1/133308 |
| | | | | 349/60 |
| 2017/0045774 A1* | 2/2017 | Yoshikawa | ....... | G02F 1/133308 |
| 2018/0120640 A1* | 5/2018 | Nitanai | ............ | G02F 1/133504 |

FOREIGN PATENT DOCUMENTS

| CN | 103953874 A | 7/2014 |
|---|---|---|
| CN | 104534351 A | 4/2015 |
| CN | 105487276 A | 4/2016 |
| CN | 108881761 A | 11/2018 |
| KR | 20170018253 A | 2/2017 |

OTHER PUBLICATIONS

ISA State Intellectual Property Office of the People's Republic of China, International Search Report Issued in Application No. PCT/CN2019/129387, dated Mar. 26, 2020, WIPO, 5 pages.

* cited by examiner

LIQUID CRYSTAL DISPLAY DEVICE

CROSS REFERENCE TO RELATED APPLICATIONS

The present application is a continuation application of International Application No. PCT/CN2019/129387 filed on Dec. 27, 2019, which claims priorities to Chinese patent application No. 2019100015283 entitled "A Liquid Crystal Display Device", filed on Jan. 2, 2019, and Chinese patent application No. 2019101004267 entitled "A Liquid Crystal Display Device", filed on Jan. 31, 2019, the entire contents of which are incorporated herein by reference.

TECHNICAL FIELD

The present disclosure relates to the field of display technology, and in particular, to a liquid crystal display device.

BACKGROUND

An LCD TV (liquid crystal display television) generally includes a backlight module and a liquid crystal panel. The backlight module may be classified into a direct-type backlight module and an edge-type backlight module according to different light source location in the backlight module. The direct-type backlight module may help realizing better image quality. LCD TVs with the direct-type backlight module take an important market share. Now, production of ultra-thin, ultra-narrow or borderless LCD TVs is a development trend.

SUMMARY

A liquid crystal display device is provided according to some embodiments of the present disclosure. The liquid crystal display device includes: a back plate, a middle frame and a diffusion plate. The back plate includes a bottom portion, and a side wall perpendicular to the bottom portion. The middle frame includes a first support portion and a second support portion disposed opposite to the first support portion, and a middle frame connection portion. The middle frame connection portion connects the first support portion and the second support portion. The first support portion is parallel to the bottom portion of the back plate. The first support portion, the second support portion and the middle frame connection portion form a recess. The diffusion plate includes a portion located within the recess.

BRIEF DESCRIPTION OF THE DRAWINGS

In order to explain the examples of the present disclosure or related art more clearly, the drawings used in the description of the examples or the related art will be briefly described below. It is obvious that the drawings in the following description are only some embodiments of the present disclosure. Those skilled in the art may also obtain other drawings based on these drawings without involving inventive work.

DETAILED DESCRIPTION OF THE EXAMPLES

Figure 1:
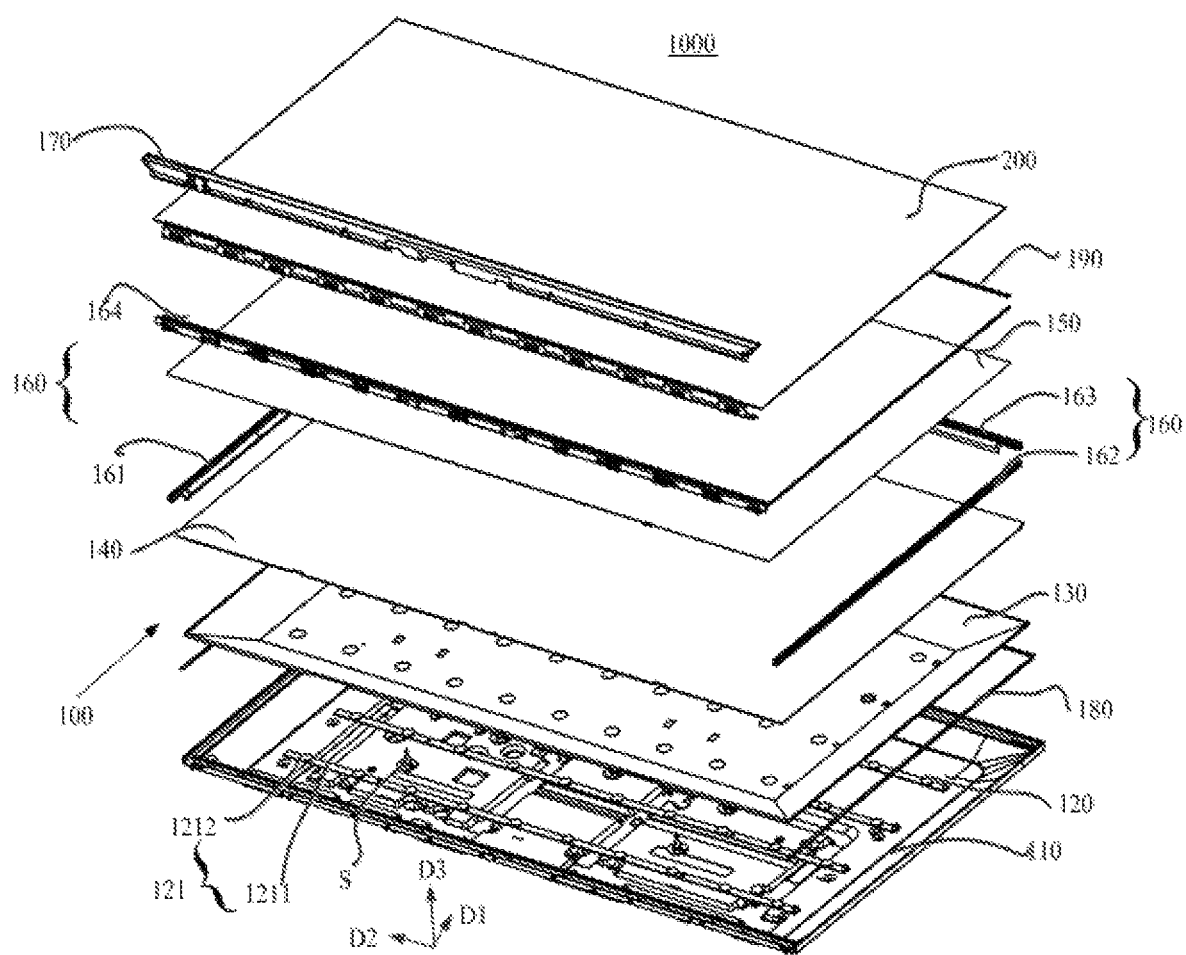
FIG. 1 is a schematic diagram illustrating an exploded structure of a liquid crystal display device according to some embodiments of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly Example embodiments will now be described more fully with reference to the accompanying drawings.

FIG. 1 is a schematic diagram illustrating an exploded structure of a liquid crystal display device.

Referring to FIG. 1, the liquid crystal display device 1000 includes a backlight module 100 and a liquid crystal panel 200.

The liquid crystal display device 1000 has a rectangular shape with short sides and long sides. A direction where the short sides locate is referred to as a first direction D1. A direction where the long sides locate is referred to as a second direction D2. The second direction D2 is substantially perpendicular to the first direction D1. The backlight module 100 and the liquid crystal panel 200 are sequentially stacked along a third vertical direction D3 substantially orthogonal to planes where the first direction D1 and the second direction D2 form.

Along a light outgoing direction in the liquid crystal display device 1000, the backlight module 100 includes a back plate 110 which functions to support, a light source 120, a reflective sheet 130, a diffusion plate 140, an optical film 150, a middle frame assembly 160, and a diffusion plate holder S.

Figure 2:
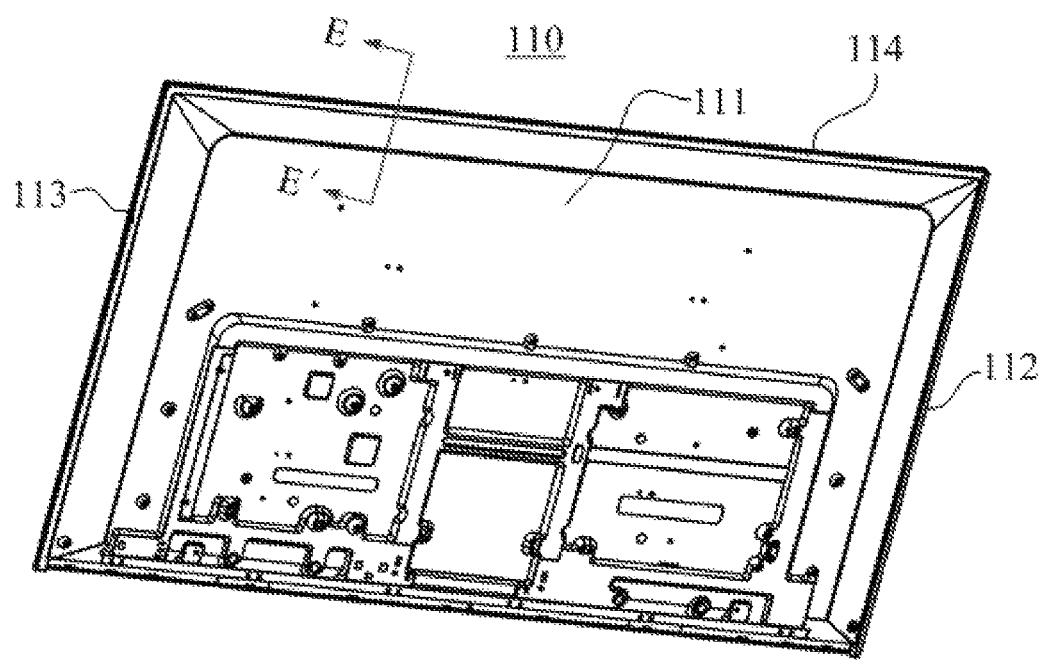
FIG. 2 is a schematic diagram illustrating a structure of a back plate shown in FIG. 1 according to some embodiments of the present disclosure.
Figure 3:
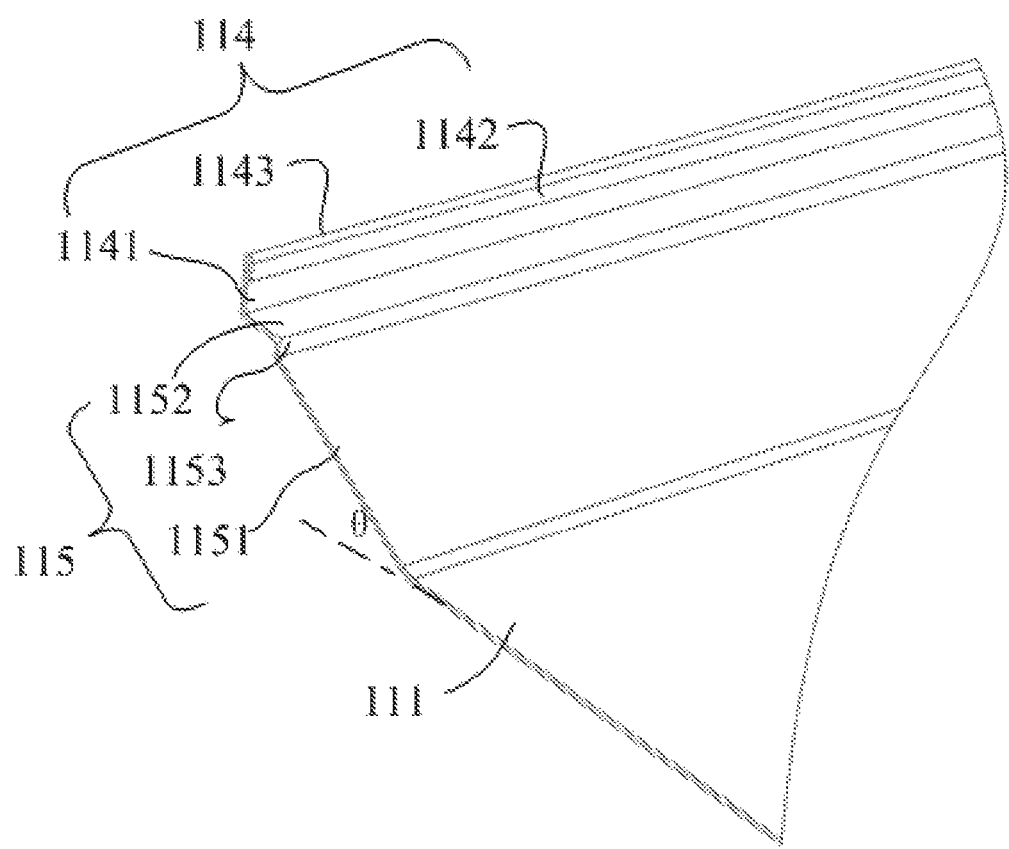
FIG. 3 is a schematic diagram illustrating a cross-sectional structure of a back plate along a direction of E-E' in FIG. 2 according to some embodiments of the present disclosure.

FIG. 2 is a schematic diagram illustrating a structure of the back plate 110 shown in FIG. 1. FIG. 3 is a schematic diagram illustrating a cross-sectional structure of the back plate 110 along a direction of E-E' in FIG. 2.

Referring to FIGS. 2 and 3, the back plate 110 includes a bottom portion 111, and a first side wall 112, a second side wall 113, and a third side wall 114, wherein the back plate is substantially perpendicular to the third direction D3 of the liquid crystal display device 1000. The first side wall 112 and the second side wall 113 are substantially parallel to the first direction D1. The third side wall 114 is substantially parallel to the second direction D2. The bottom portion 111 is parallel to a plane where the liquid crystal panel 200 locates.

Taking the third side wall 114 as an example, the third side wall 114 includes a first sub-side wall 1141 and a second sub-side wall 1142 which are disposed in the third direction D3 of the liquid crystal display device 1000. In some embodiments, the second sub-side wall 1142 is on an inside of the back plate 110. In other embodiments, the first sub-side wall 1141 is closer to the bottom portion 111 of the back plate 110 than the second sub-side wall 1142. The first sub-side wall 1141 and the second sub-side wall 1142 are connected through a side wall connection portion 1143. The first sub-side wall 1141, the second sub-side wall 1142, and the side wall connection portion 1143 are integrally connected. The second sub-side wall 1142 is formed by integral bending. In this way, the strength of the back plate 110 is reinforced through the bending process.

In order to ensure a desirable light mixing distance and appearance effect, the back plate 110 further includes a back plate connection portion 115 between the bottom portion 111 and side walls. The back plate connection portion 115 includes a slope portion 1151, a platform portion 1152 and a transition portion 1153. The slope portion 1151 is connected with an edge of the bottom portion 111. The platform portion 1152 is connected with an end of the first side wall 112 or the second side wall 113 or the third side wall 114. The transition portion 1153 is connected with the slope portion 1151 and the platform portion 1152. A first angle θ at which the slope portion 1151 is inclined with respect to the bottom portion 111 is in a range of about 20 degrees to about 50 degrees, inclusive, such as 25 degrees, 30 degrees, 35 degrees, 40 degrees. The curve optimization design makes the display device lighter and thinner in appearance and thus has a good appearance. A plane where the platform portion 1152 locates is substantially perpendicular to the third direction D3 and parallel to a plane where the liquid crystal panel 200 locates. A plane where the transition portion 1153 locates is substantially parallel to the third direction D3. The three-segment design of the slope portion, the transition portion, and the platform portion reduces the processing difficulty of the back plate during its practical production.

The first side wall 112 and the second side wall 113 have substantially the same structure as the third side wall 114 in the back plate 110.

The bottom portion 111, the first side wall 112, the second side wall 113, the third side wall 114, and the back plate connection portion 115 in the back plate 110 form an integrated structure. That is, the back plate 110 is of an integrally formed structure. For the processing of the back plate, an integral bending manner may be adopted to reinforce the strength of the back plate 110 and have a good appearance.

In addition, since the back plate 110 includes three side walls integrally formed, a fourth side wall other than the three side walls is not provided with the above structure for the purpose of assembly, which facilitates the assembly of the diffusion plate and the optical film.

In FIG. 1, the light source 120 is configured to generate light, and it includes a plurality of LED strips 121 disposed along the second direction D2. The plurality of LED strips 121 are disposed substantially in parallel. The LED strips 121 include a circuit board 1211 and a plurality of LED lamps 1212 located on one side of the circuit board 1211. The other side of the circuit board 1211 is in contact with the back plate 110. The LED strips 121 are fixed to the back plate 110 through a connection member.

The reflective sheet 130 is configured to reflect light to a light emitting direction. The reflective sheet 130 is fixed on a surface of the back plate 110. A plurality of through holes are on the reflective sheet 130 for exposing the LED lamps 1212.

The diffusion plate 140 is configured to refract and reflect the light from the light source 120, thereby homogenizing the light.

The optical film 150 usually includes one or more films mainly for condensing light and increasing brightness.

The diffusion plate holder S is on the back plate 110 and configured to support the diffusion plate 140, thereby ensuring the light mixing distance of the liquid crystal display device 1000.

The middle frame assembly 160 is at edges of the reflective sheet 130, the diffusion plate 140, and the optical film 150. The middle frame assembly 160 and the slope portion 1151 cooperate to support the reflective sheet 130. The middle frame assembly 160 includes a first middle frame 161 and a second middle frame 162 which are substantially parallel to the first direction D1, and a third middle frame 163 and a fourth middle frame 164 which are substantially parallel to the second direction D2. The fourth middle frame 164 and a front case 170 are cooperatively connected.

The respective middle frames included in the middle frame assembly 160 are assembled by splicing. Alternatively, the first, second, and third middle frames may also be integrally formed. A middle frame adhesive tape 180 is disposed among the first middle frame 161, the second middle frame 162, the third middle frame 163, and the back plate 110, so that the middle frame assembly 160 is fixed on the back plate 110 through the middle frame adhesive tape 180. A panel adhesive tape 190 is disposed between the middle frame assembly 160 and the liquid crystal panel 200. The liquid crystal panel 200 is fixed on the middle frame assembly 160 through the panel adhesive tape 190.

The liquid crystal display device 1000 may further include a rear case (not shown) which is joined to a side of the back plate 110 away from the liquid crystal panel 200.

Figure 4:
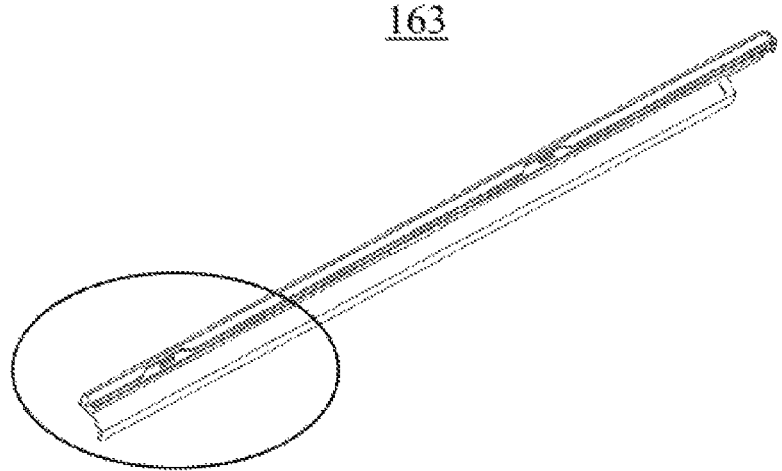
FIG. 4 is a schematic diagram illustrating a perspective structure of a third middle frame shown in FIG. 1 according to some embodiments of the present disclosure.
Figure 5:
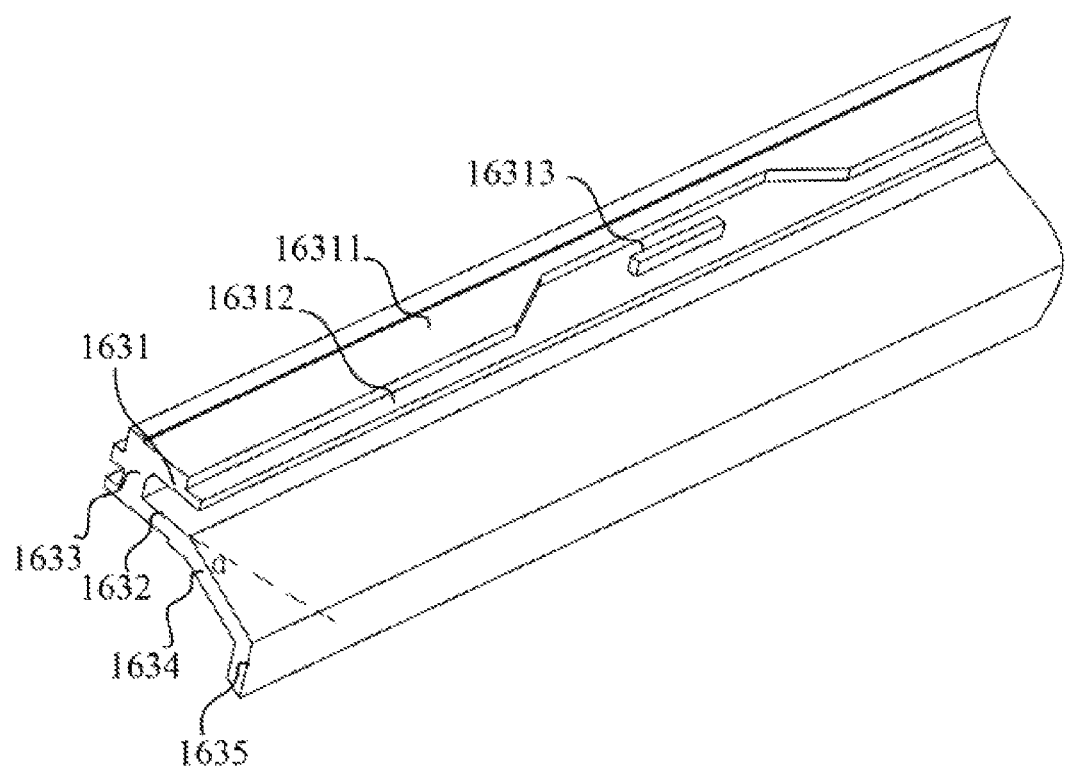
FIG. 5 is an enlarged view illustrating a circle portion in FIG. 4 according to some embodiments of the present disclosure.

FIG. 4 is a schematic diagram illustrating a perspective structure of the third middle frame 163 shown in FIG. 1. FIG. 5 is an enlarged view illustrating a circle portion in FIG. 4.

Referring to FIGS. 4 and 5, the third middle frame 163 integrally forms a recess structure. The third middle frame 163 includes a first support portion 1631, a second support portion 1632, and a middle frame connection portion 1633. The first support portion 1631 and the second support portion 1632 are disposed opposite to each other and are perpendicular to the third direction D3. The middle frame connection portion 1633 is configured to connect the first support portion 1631 with the second support portion 1632 and is between the first support portion 1631 and the second support portion 1632. The first support portion 1631, the second support portion 1632 and the middle frame connection portion 1633 form a recess.

The first support portion 1631 includes a panel support portion 16311 and a film support portion 16312. According to the lamination relationship in the liquid crystal display device 1000, the panel support portion 16311 and the film support portion 16312 have a certain height difference and form a stepped shape. The film support portion 16312 is adjacent to an end of the first support portion 1631. A protrusion 16313 is disposed on the film support portion 16312. A hanging lug of the optical film is hooked on the protrusion 16313 so as to fix the optical film.

In some embodiments, the third middle frame 163 further includes a reflective sheet support portion 1634. The reflective sheet support portion 1634 extends along an end of the second support portion 1632 and is at a second angle α with respect to the second support portion 1632. The second angle α is set to be in a range of about 20 to 50 degrees, inclusive, such as 25 degrees, 30 degrees, 35 degrees, and 40 degrees. The reflective sheet support portion 1634 is configured to support the reflective sheet 130 (shown in FIG. 1). The reflective sheet 130 may be fixed on the reflective sheet support portion 1634 by adhesion or the like. The reflective sheet support portion 1634 is configured to support and fix the reflective sheet 130.

In other embodiments, the third middle frame 163 further includes a support portion 1635 connected with an end of the reflective sheet support portion 1634. The support portion 1635 extends toward a direction away from the first support portion 1631. A plane where the support portion 1635 locates is substantially parallel to the third direction D3. The support portion 1635 is in contact with the back plate 110 (shown in FIG. 1) for support, so as to prevent the third middle frame from being inverted.

The first middle frame 161 and the second middle frame 162 have substantially the same structure as the third middle frame 163. Unlike the third middle frame 163, the first middle frame 161 and the second middle frame 162 do not include the film support portion 16312. For the specific structure of the first middle frame 161 and the second middle frame 162, reference may be made to corresponding description with regard to FIGS. 9-10.

Hereinafter, the relative positional relationship of assembled components in the liquid crystal display device 1000 will be described.

Figure 6:
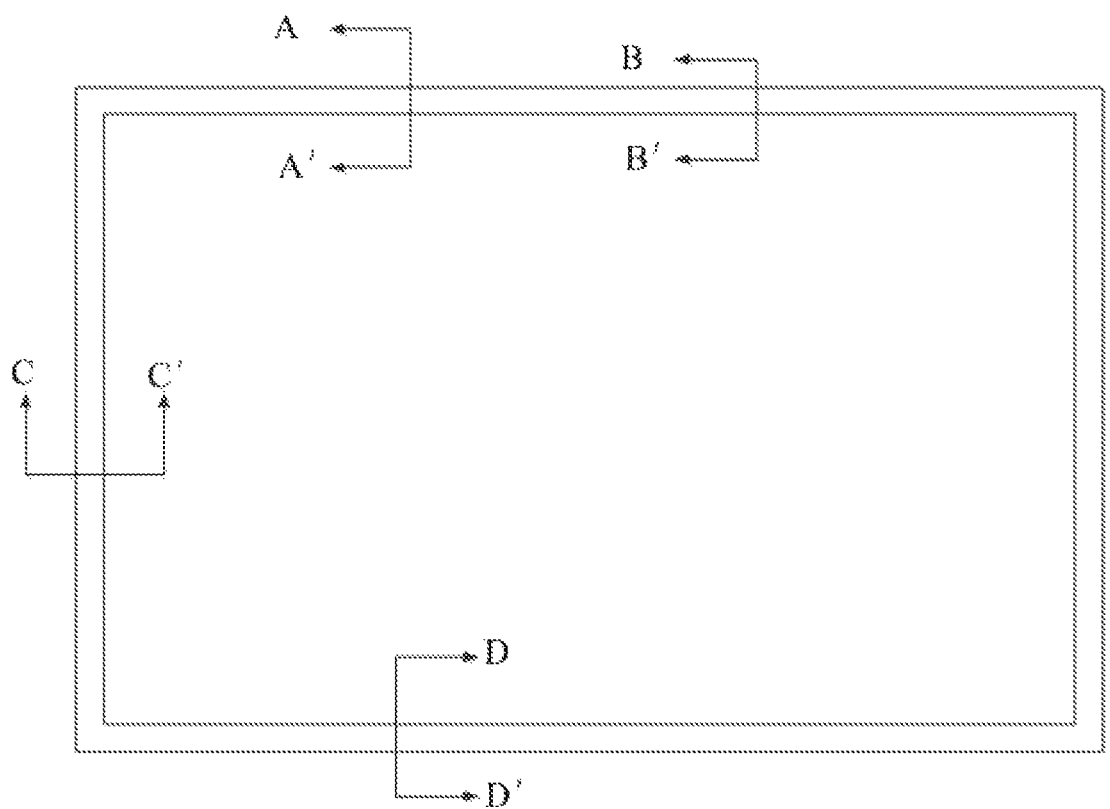
FIG. 6 is a simplified top view illustrating a liquid crystal display device according to some embodiments of the present disclosure.
Figure 7:
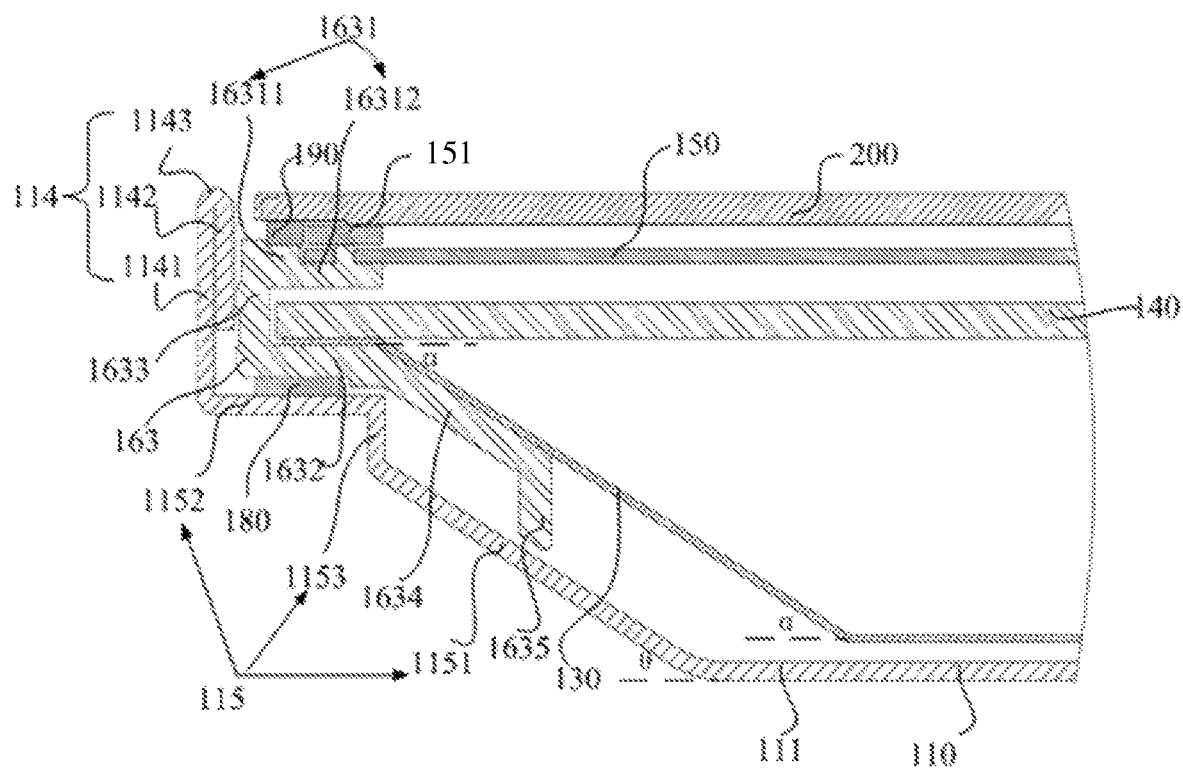
FIG. 7 is a schematic diagram illustrating a cross-sectional structure of the liquid crystal display device along a direction of A-A' in FIG. 6 according to some embodiments of the present disclosure.
Figure 8:
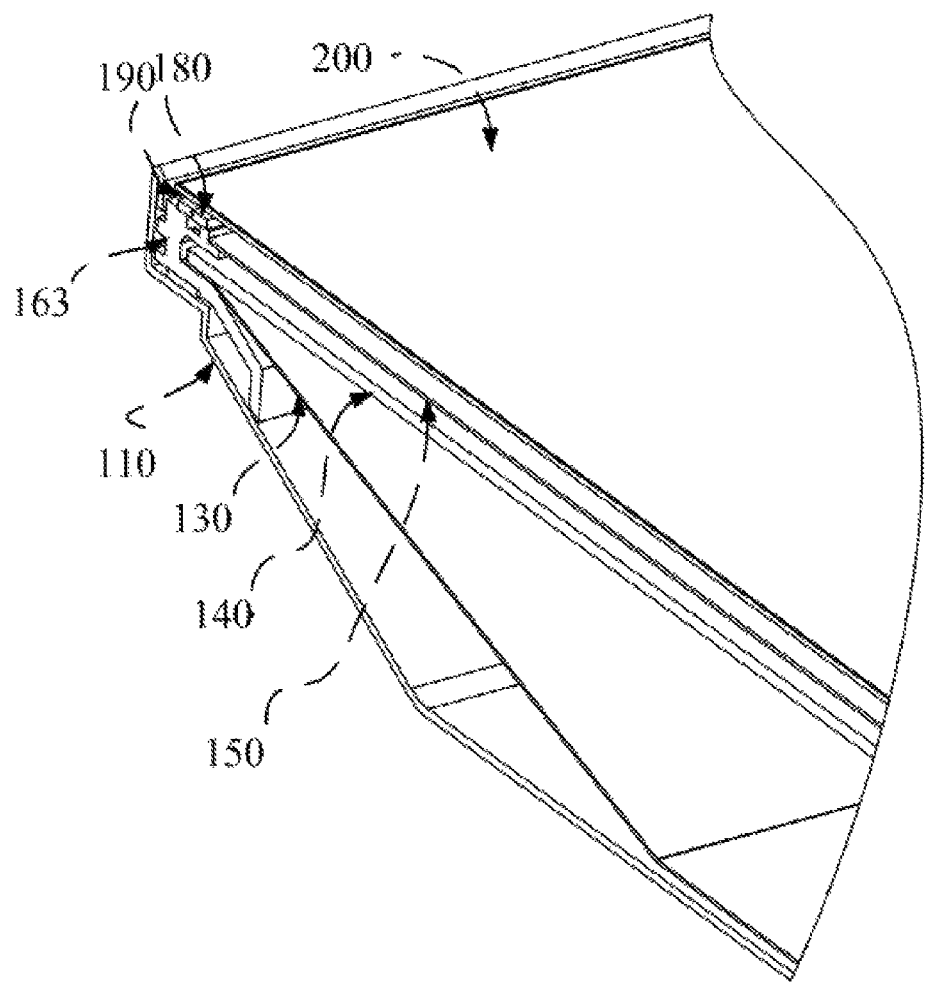
FIG. 8 is a schematic diagram illustrating a perspective cross-sectional structure of the liquid crystal display device along a direction of A-A' in FIG. 6 according to some embodiments of the present disclosure.

FIG. 6 is a simplified top view illustrating a liquid crystal display device 1000. FIGS. 7 and 8 are schematic diagrams respectively illustrating a cross-sectional structure of the liquid crystal display device along a direction of A-A' in FIG. 6, in which A-A' corresponds exactly to a position where a hanging lug of an optical film locates.

In FIGS. 7 and 8, the liquid crystal display device 1000 includes a back plate 110, a reflective sheet 130, a diffusion plate 140, an optical film 150, a third middle frame 163, and a liquid crystal panel 200.

The third middle frame 163 is on a side of a third side wall 114 of the back plate 110 close to a bottom portion 111. The third middle frame 163 includes a first support portion 1631, a second support portion 1632 and a middle frame connection portion 1633. The first support portion 1631 and the second support portion 1632 are disposed opposite to each other, and the middle frame connection portion 1633 is connected between the first support portion 1631 and the second support portion 1632. The first support portion 1631, the second support portion 1632 and the middle frame connection portion 1633 form a recess. The diffusion plate 140 is within the recess. The first support portion 1631 holds the liquid crystal panel 200. The middle frame is disposed on a side of the side wall of the back plate close to the bottom portion. The liquid crystal panel is at the first support portion of the third middle frame. A portion of the diffusion plate is within the recess formed by the first support portion, the second support portion and the middle frame connection portion. In this way, without disposing a frame on this side, it is possible to ensure that components inside the liquid crystal display device are not exposed, and the diffusion plate and the liquid crystal panel are fixed, thereby realizing the frameless design of the liquid crystal display device.

The third side wall 114 includes a first sub-side wall 1141, a side wall connection portion 1143, and a second sub-side wall 1142 which are integrally connected. The first sub-side wall 1141, the side wall connection portion 1143, and the second sub-side wall 1142 are formed by integral bending. The third middle frame 163 is on a side of the second sub-side wall 1142 away from the first sub-side wall 1141. After being assembled in this way, compared to the case where the third side wall 114 includes only the first sub-side wall 1141, an exposed portion is the side wall connection portion 1143 instead of an end portion of the first sub-side wall 1141. The side wall connection portion 1143 is a smoothly transitioning curved surface and has a good appearance. The first sub-side wall 1141 and the side wall connection portion 1143 may be configured as design surfaces by spraying directly thereon.

The third middle frame 163 is between the back plate 110 and the liquid crystal panel 200. A middle frame adhesive tape 180 is disposed between a platform portion 1152 of the back plate 110 and the second support portion 1632 of the third middle frame, and configured to fix the third middle frame 163 on the back plate 110.

The reflective sheet 130 is on a reflective sheet support portion 1634 of the third middle frame 163. An edge of the reflective sheet 130 is at the second support portion 1632. The reflective sheet support portion 1634 is at a second angle α with respect to the second support portion 1632. Accordingly, the reflective sheet 130 is also at a second angle α with respect to the second support portion 1632. That is, the reflective sheet 130 is at a second angle α with respect to the bottom portion 111. The angle of a is in a range of 20 to 50 degrees, preferably 30 degrees. Compared with the case where the reflective sheet 130 is directly adhered to the back plate 110, more light from a light source is reflected back to a display region of the display device, which contributes to improve the display brightness of the display device.

The third middle frame 163 further includes a support portion 1635 connected with an end of the reflective sheet support portion 1634. The support portion 1635 is in contact with a slope portion 1151 of the back plate 110 for support, so as to prevent the third middle frame from being inverted.

The diffusion plate 140 is on a side of the second support portion 1632 close to the liquid crystal panel 200. That is, the diffusion plate 140 is inserted into the recess formed by the first support portion 1631, the second support portion 1632, and the middle frame connection portion 1633.

The first support portion 1631 of the third middle frame 163 is between the diffusion plate 140 and the liquid crystal panel 200. The optical film 150 is on a film support portion 16312. A film hanging lug on the optical film 150 is hooked on a protrusion 16313. A film fixing adhesive tape 151 is on the film hanging lug and the protrusion 16313, and configured for fixing the optical film 150 to the film support portion 16312. A panel adhesive tape 190 is disposed between the liquid crystal panel 200 and the panel support portion 16311, thereby fixing the liquid crystal panel 200 into the third middle frame 163.

Figure 9:
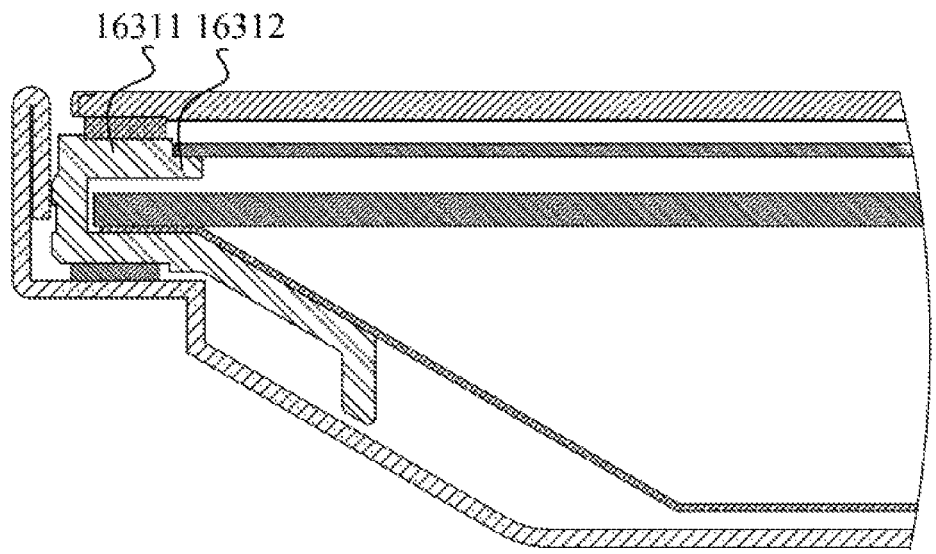
FIG. 9 is a schematic diagram illustrating a cross-sectional structure of the liquid crystal display device along a direction of B-B' in FIG. 6 according to some embodiments of the present disclosure.

FIG. 9 is a schematic diagram illustrating a cross-sectional structure of the liquid crystal display device 1000 along a direction of B-B' in FIG. 6, in which B-B' corresponds exactly to an area with no film hanging lug. Different from the structure with the film hanging lug in FIG. 7, no protrusion is disposed on the film support portion 16312. The rest of the structure is similar to that shown in FIG. 7, and details thereof are not repeated herein.

Figure 10:
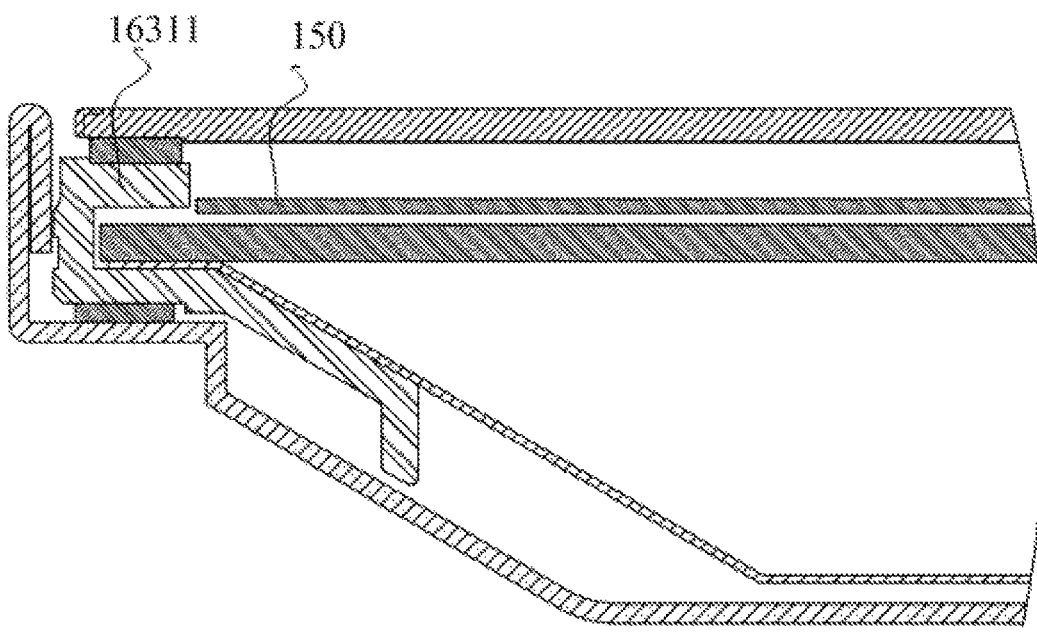
FIG. 10 is a schematic diagram illustrating a cross-sectional structure of the liquid crystal display device along a direction of C-C' in FIG. 6 according to some embodiments of the present disclosure.

FIG. 10 is a schematic diagram illustrating a cross-sectional structure of the liquid crystal display device 1000 along a direction of C-C' in FIG. 6. Different from the structures shown in FIGS. 7 and 9, the first support portion of the first (or second) middle frame includes only the panel support portion, without the film support portion, and there is no cooperation structure between the optical film 150 and the middle frame, and the middle frame only serves to limit the position of the film.

Figure 11:
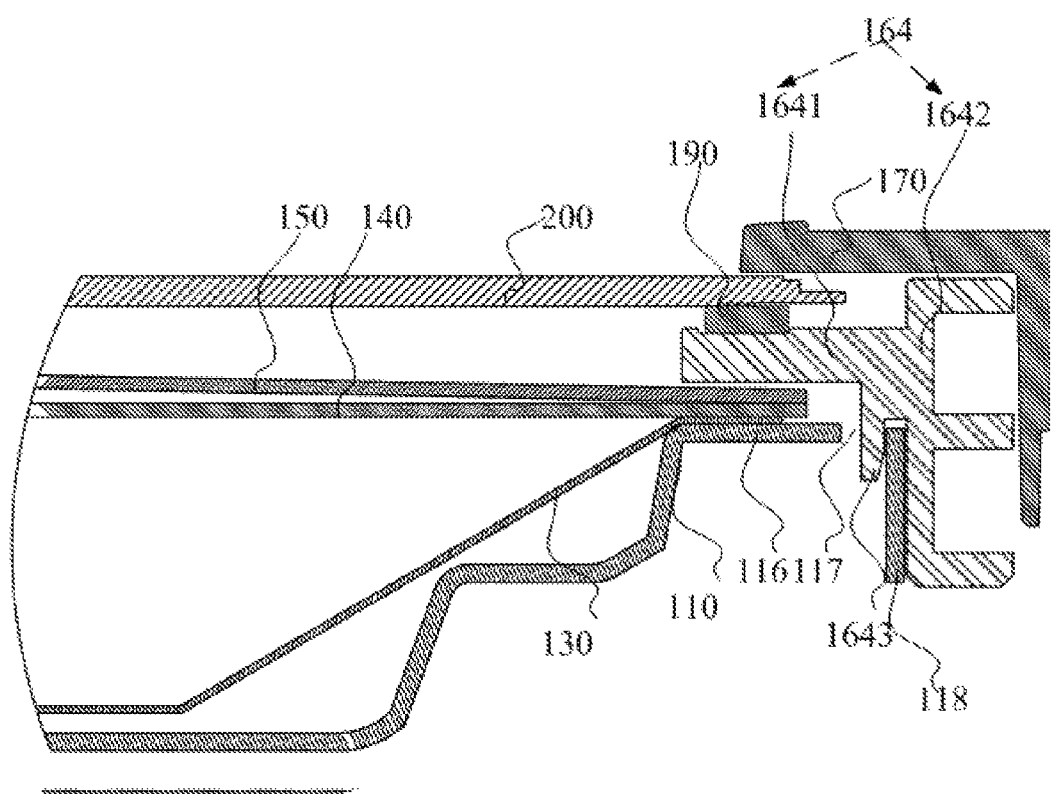
FIG. 11 is a schematic diagram illustrating a cross-sectional structure of the liquid crystal display device along a direction of D-D' in FIG. 6 according to some embodiments of the present disclosure.
Figure 12:
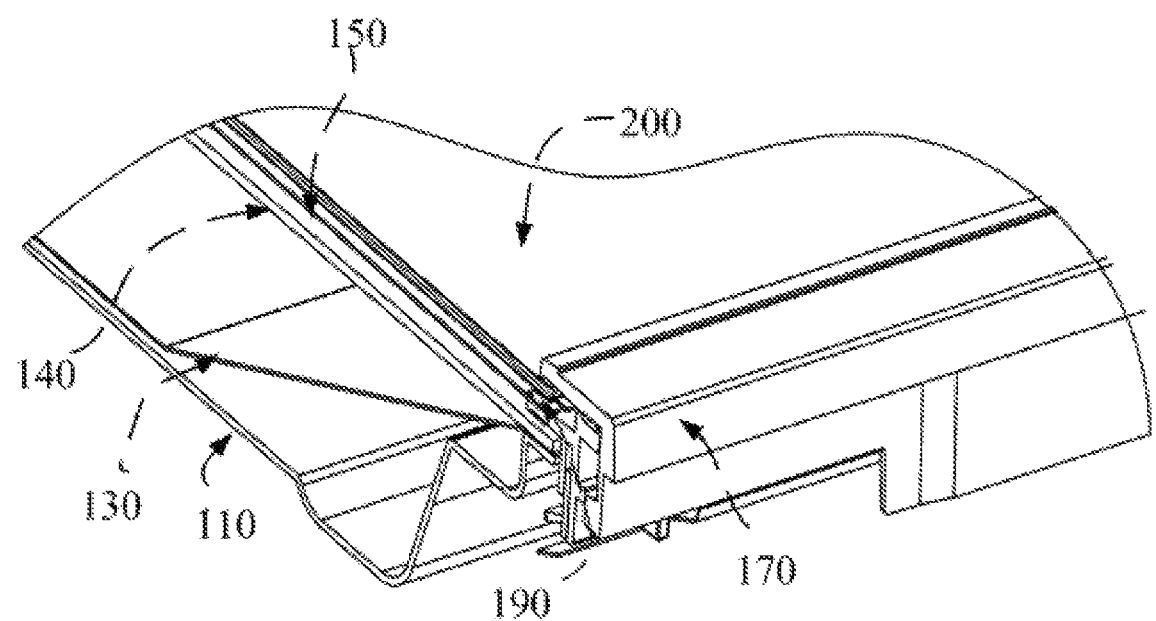
FIG. 12 is a schematic diagram illustrating a perspective cross-sectional structure of the liquid crystal display device along a direction of D-D' in FIG. 6 according to some embodiments of the present disclosure.

FIGS. 11 and 12 are schematic diagrams respectively illustrating a cross-sectional structure of a liquid crystal display device 1000 along a direction of D-D' in FIG. 6.

In FIGS. 11 and 12, the liquid crystal display device 1000 includes a back plate 110, a reflective sheet 130, a diffusion plate 140, an optical film 150, a fourth middle frame 164, a liquid crystal panel 200, and a front case 170. The fourth middle frame 164 is at edges of the reflective sheet 130, the diffusion plate 140, and the optical film 150.

The back plate 110 includes a back plate support portion 116 for holding the reflective sheet 130, the diffusion plate 140, and the optical film 150. The reflective sheet 130, the diffusion plate 140, and the optical film 150 are laminated in sequence. The back plate support portion 116 includes a receptacle 117.

The back plate 110 further includes a lower side wall 118 formed by extending away from the liquid crystal panel 200 in a third direction D3.

The fourth middle frame 164 includes a middle frame pressing portion 1641 parallel to the liquid crystal panel 200. The middle frame pressing portion 1641 includes a first side surface and a second side surface opposite to the first side surface. The first side surface of the middle frame pressing portion 1641 is in contact with a side of the optical film 150 away from the back plate 110, and the second side surface of the middle frame pressing portion 1641 is provided with a panel adhesive tape 190. The panel adhesive tape 190 is configured to adhere the liquid crystal panel 200.

The fourth middle frame 164 further includes a front case support wall 1642 and an insertion arm 1643. The front case support wall 1642 and the insertion arm 1643 are perpendicular to the middle frame pressing portion 1641. The insertion arm 1643 is adjacent to an end of the middle frame pressing portion 1641. The insertion arm 1643 is inserted into the receptacle 117 of the back plate 110. A slot is formed between the insertion arm 1643 and the front case support wall 1642. The lower side wall 118 is in the slot formed by the insertion arm 1643 and the front case support wall 1642.

The front case 170 is pressed into an edge of the liquid crystal panel 200, and encloses an end of the front case support wall 1642 away from the back plate 110 and a side of the front case support wall 1642 away from the middle frame pressing portion 1641, so as to prevent light leakage and improve beautify appearance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A liquid crystal display device, comprising:
a back plate comprising:

a bottom portion, and a side wall perpendicular to the bottom portion, wherein the side wall comprises:
   a first sub-side wall,
   a second sub-side wall, and
   a side wall connection portion connecting the first sub-side wall and the second sub-side wall,
   wherein the first sub-side wall, the second sub-side wall, and the side wall connection portion form an integral structure; and a back plate connection portion connecting the bottom portion and the side wall, wherein the back plate connection portion comprises:
   a platform portion connecting with the side wall and being parallel to the bottom portion,
   a slope portion connecting with the bottom portion and being at a first angle with respect to the bottom portion, where the first angle is in a range of 20 degrees to 50 degrees, inclusive, and
   a transition portion connecting the slope portion and the platform portion;

a middle frame comprising:
   a first support portion parallel to the bottom portion of the back plate,
   a second support portion disposed opposite to the first support portion, wherein the platform portion of the back plate connection portion is configured to support the second support portion of the middle frame, and
   a middle frame connection portion connecting the first support portion and the second support portion, wherein the first support portion, the second support portion and the middle frame connection portion form a recess; and a diffusion plate comprising a portion located within the recess.

2. The liquid crystal display device according to claim 1, wherein the middle frame connection portion is on a side of the side wall of the back plate close to the bottom portion of the back plate.

3. The liquid crystal display device according to claim 1, further comprising:
   a liquid crystal panel which is held by the first support portion.

4. The liquid crystal display device according to claim 1, further comprising:
   a reflective sheet supported by the middle frame and the slope portion.

5. The liquid crystal display device according to claim 1, wherein the bottom portion, the side wall, and the back plate connection portion form an integral structure.

6. The liquid crystal display device according to claim 1, further comprising:
   a middle frame adhesive tape disposed between the middle frame and the back plate and configured to fix the middle frame to the back plate.

7. The liquid crystal display device according to claim 4, wherein the middle frame further comprises:
   a reflective sheet support portion connecting with the second support portion and configured to support the reflective sheet, wherein the reflective sheet support portion is at a second angle with respect to the second support portion.

8. The liquid crystal display device according to claim 7, wherein the second angle is in a range of 20 degrees to 50 degrees, inclusive.

9. The liquid crystal display device according to claim 7, wherein the middle frame further comprises a support portion connecting with the reflective sheet support portion, wherein the support portion is in contact with the back plate for support, to prevent the middle frame from being inverted.

10. The liquid crystal display device according to claim 1, further comprising:
    an optical film; and
    wherein the first support portion comprises:
       a panel support portion configured to support a liquid crystal panel, and
       a film support portion configured to support the optical film.

11. The liquid crystal display device according to claim 10, wherein
    the panel support portion is different from the film support portion in height; and
    the film support portion comprises a protrusion for hooking the optical film.

* * * * *